(12) United States Patent
Viswanathan et al.

(10) Patent No.: US 8,477,379 B2
(45) Date of Patent: Jul. 2, 2013

(54) SECURE DOCUMENT WORKFLOW

(75) Inventors: Kapaleeswaran Viswanathan, Bangalore (IN); Anjaneyulu Seetha Rama Kuchibhotla, Bangalore (IN); Nagabhushana Ayyanahal Matad, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 12/629,070

(22) Filed: Dec. 2, 2009

(65) Prior Publication Data

US 2011/0080618 A1    Apr. 7, 2011

(30) Foreign Application Priority Data

Oct. 6, 2009  (IN) .......................... 2415/CHE/2009

(51) Int. Cl.
*G06K 15/02* (2006.01)
(52) U.S. Cl.
USPC ...................................................... 358/3.28
(58) Field of Classification Search
USPC .... 358/3.28; 713/181, 184, 201, 156; 380/54, 380/216; 382/302; 726/26, 1; 705/3
See application file for complete search history.

(56) References Cited

U.S. PATENT DOCUMENTS

| | | | |
|---|---|---|---|
| 6,158,007 A * | 12/2000 | Moreh et al. | 726/1 |
| 6,970,259 B1 | 11/2005 | Lunt et al. | |
| 7,120,798 B2 | 10/2006 | Suisa | |
| 2002/0080959 A1 | 6/2002 | Weller | |
| 2003/0217264 A1 * | 11/2003 | Martin et al. | 713/156 |
| 2003/0217275 A1 * | 11/2003 | Bentley et al. | 713/184 |
| 2004/0080777 A1 | 4/2004 | Smith | |
| 2006/0117182 A1 | 6/2006 | Wolff | |
| 2008/0216147 A1 * | 9/2008 | Duffy | 726/1 |
| 2008/0275731 A1 * | 11/2008 | Rao et al. | 705/3 |
| 2008/0301815 A1 * | 12/2008 | Lauter et al. | 726/26 |
| 2009/0180698 A1 | 7/2009 | Ramani et al. | |
| 2010/0153843 A1 | 6/2010 | Sankarasubramaniam et al. | |

OTHER PUBLICATIONS

"Business Process Execution Language", Wikipedia, Wikipedia Foundation Inc. http://en.wikipedia.org/wiki/Business_Process_Execution_Language, Apr. 14, 2011.
"Establishing Trust in Online Identities", ActivIentity Corporation; http://www.activeidentity.com/, Copyright 2010.
"Identity Management", Wikipedia Foundation, Inc. http://en.wikipedia.org/wiki/Identity_management, Apr. 14, 2011.
"Tuple", Wikipedia Foundation,Inc, http://en.wikipedia.org/wiki/Tuple, Mar. 25, 2011.

* cited by examiner

*Primary Examiner* — Charoltte M Baker (57) ABSTRACT

Presented is a method, for a participant in a secure document workflow, of generating workflow information for authenticating a document. The method comprises: receiving an image of the document; generating workflow information for the document image, including a document image descriptor dependent upon the appearance of the document image for later verifying the authenticity of a version of the document image that has been printed and scanned, the verification comprising electronically combining or comparing the document image descriptor with said version of the document image; generating a digital signature for later verifying the authenticity of the workflow information, the digital signature being derived from the workflow information using a cryptographic key associated with the participant; adding the digital signature to the workflow information; and communicating the document image and the workflow information to another workflow participant.

14 Claims, 7 Drawing Sheets

INSTITUTE OF SCIENCE AND TECHNOLOGY
GRADE SHEET

DATE OF ISSUE

| W54 | SEVENTH SEMESTER 2001-05 | 22-03-2005 |

ID NO.   1BIO1C
NAME     RAJ SHEKHAR
ADDRESS  K R LAYOUT, MYSORE

| COURSE NO. | COURSE TITLE | UNIT | GRADE |
|---|---|---|---|
| BTS C31 | LAB ORIENTED PROJECT STUDY ORIENTED | 3 | A  EL |
| BTS C32 | PROJECT | 3 | A  EL |
| EEE C61 | CODING THEORY AND PRACTICE | 5 | A  EL |
| EEE C41 | DIGITAL COMMUNICATION | 3 | W  EL |
| EEE C42 | DIGITAL SIGNAL PROCESSING | 3 | B  EL |

```
CGPA CUP   1320              ACCU CUP   1320
ACCUMULATED UNITS                        141
UNITS FOR CALCULATING CGPA               141
CGPA                                    9.36
```

INSTITUTE OF SCIENCE AND TECHNOLOGY
GRADE SHEET

DATE OF ISSUE

| W54 | SEVENTH SEMESTER 2001-05 | 22-03-2005 |

ID NO.    1BIO1C
NAME      RAJ SHEKHAR
ADDRESS   K R LAYOUT, MYSORE

| COURSE NO. | COURSE TITLE | UNIT | GRADE |
|---|---|---|---|
| BTS C31 | LAB ORIENTED PROJECT | 3 | A   EL |
| BTS C32 | STUDY ORIENTED PROJECT | 3 | A   EL |
| EEE C61 | CODING THEORY AND PRACTICE | 5 | A   EL |
| EEE C41 | DIGITAL COMMUNICATION | 3 | W   EL |
| EEE C42 | DIGITAL SIGNAL PROCESSING | 3 | B   EL |

CGPA CUP   1320                ACCU CUP   1320
ACCUMULATED UNITS                         141
UNITS FOR CALCULATING CGPA                141
CGPA                                      9.36

SECURE DOCUMENT WORKFLOW

RELATED APPLICATIONS

Benefit is claimed under 35 U.S.C. 119(a)-(d) to Foreign application Serial No. 2415/CHE/2009 entitled "SECURE DOCUMENT WORKFLOW" by Hewlett-Packard Development Company, L.P., filed on 6 Oct., 2009, which is herein incorporated in its entirety by reference for all purposes

BACKGROUND

Workflows help organizations to securely manage and monitor the production of documents. By imposing restrictions on the processes by which important documents are generated, workflows promote greater confidence in the authenticity of each document. This is particularly true of electronic document workflows, where digital signature techniques, for example, can provide an additional mechanism for guaranteeing and validating the authenticity of the document.

A simple document workflow consists of a single human operator and a printer. A document in such a workflow can only be printed by the printer if it is verified as authentic and originates from an authorized individual. More complex print workflows can include more than one human operator with a printer after the last human operator.

For example, a bank may implement a document workflow in relation to the generation of letters of credit. The letter can only be created by a first bank employee (or class of employees) authorized to do so. The letter must then be cross-checked by a second employee authorized to perform this separate task. Only if both these requirements have been fulfilled can the letter of credit be printed and issued to the customer. This problem is addressed if there is an electronic system that enforces this control. However, there are many document workflows where the control needs to be manually enforced and so is subject to fraud.

Unfortunately, although powerful known cryptographic techniques can be used to sign and later verify digital electronic information, such techniques are not suitable once the document in question has been printed. Printing and transmission of hard-copy, paper documents is therefore one of the weakest links in the chain of information security.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Two related types of forgery can be considered in relation to a document in a secure document workflow. The document should be produced by a producer and sent to a consumer. A forger may wish to induce the consumer to accept a communication as originating from the producer when in fact the communication was produced by the forger. This is referred to as an authentication attack. Secondly, the forger may wish to induce the consumer to accept a modified version of the communication that was originally (genuinely) sent by the producer. This is referred to as an integrity attack. Note that in general, in either case, the forger may be internal or external to the producer organization. Similarly, the consumer may be in the same organization or a different organization.

It would be desirable to address both the authentication and integrity attacks for documents in electronic form as well as printed versions of these documents. It would also be desirable to automatically or semi-automatically verify the authenticity of both electronic and print versions of the document.

Workflows that involve printing typically have the weakest link at the part of the workflow which involves printing. Internal fraud within an organization can has lead to documents being generated without any authorization. Even when it is discovered, it can be very difficult to trace the source of such fraud.

According to embodiments, methods are provided for defining a secure workflow, enforcing this workflow, generating secure workflow information for embedding on a printed document and for later verifying that secure workflow information. Embodiments use workflow digital signature algorithms. These are similar to standard digital signature algorithms, except that they involve more than one digital signer, each with a unique private key for signing. As will be familiar to the skilled person, some workflow digital signature algorithms can allow the order of participation of digital signers in the workflow signature generation process to be cryptographically verified (however, enforcing order is not essential in all applications).

Figure 1:
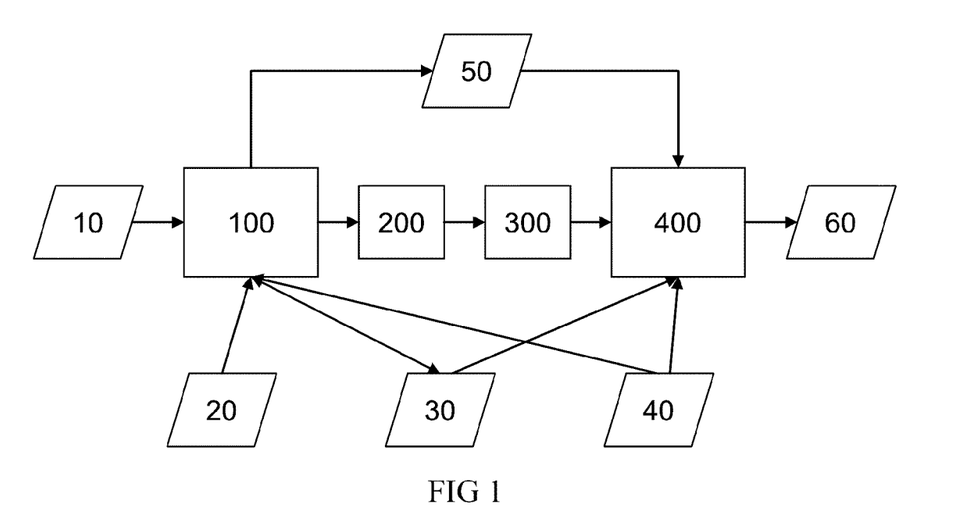
FIG. 1 shows the high-level architecture of a secure print workflow system according to an embodiment.

If workflow-based cryptographic control is enforced on the printing process, more effective print control may be realized within an organization. The high-level architecture diagram of an embodiment is shown in FIG. 1. The architectural elements are the Secure Print Workflow (SPW) Control 100, Secure Print Workflow Verification 400, and the optional SPW Control Information channel 50. The optional SPW Control Information channel 50 can be realized, for example, as a centralized or distributed database.

The Secure Print Workflow Control and Secure Print Workflow Verification will now be described.

A workflow engine 500 (not shown in FIG. 1) provides a workflow template 30. A workflow template provides a definition of the workflow. It may simply be a sequence of names of entities (for example, employees) who are required to participate before a document image is printed. The workflow engine could be of a conventional type, such as the HP Exstream enterprise document automation platform.

A document image or set of document images 10 is provided by document generation software, which may also be of a conventional type (for example, word processing or desktop publishing software). The term "document image" refers to the visual content and appearance of a document and includes in its scope an electronic document in any form, including separate or combined text and graphics, with layout, formatting, and style metadata, which together determine the appearance of the document. At its simplest it includes a bitmap image of a scanned paper document. There is a distinction between a document image and the data content of a document. The data content may include information such as the words and numbers which the document is designed to communicate. The document image will contain this data (if it is visible on the document), in addition to other visual details. For example, if the document is a check or bank draft, the data content may include the numerical amount to be paid, the date, a text field for the payee, a text field for the payer and the payer's account number. The document image of the check will capture all of this, in addition to the appearance of the payee's signature, any watermark or bank stamp on the face of the check, and the bank logo. A key difference is that it may not always be possible to extract the data content of a document (whether by machine reading or manual data entry)—for example, if there are photographs, graphics or hand-written text. In contrast, a document image is always obtainable—for example, by scanning a paper document. Therefore, a workflow in which authentication is based on the document image may be generically applicable to a wide variety of types of document.

The entities involved in the workflow have private keys 20, which are used by each entity to sign the workflow information. Key management software for public key cryptography systems (including workflow digital signature algorithms) is well known in the art. Each workflow participant is also assumed to have an associated public key certificate, which is electronically accessible to other participants—either via the workflow engine 500, or by some other means.

Optionally, the actions of the users in the SPW process 100 may result in modifications to the workflow template 30. This is indicated by the bi-directional flow between these elements in FIG. 1.

When the document has been signed by each of the required entities, it is printed 200 and delivered to the consumer. The consumer who receives the printed document wishes to verify its authenticity. The document is scanned 300 and subjected to the secure print workflow verification 400. This uses public keys 40, corresponding to the private keys 20 used to sign the document in the secure print workflow. The result of verification is a report 60. Instead of scanning, the consumer may use alternative means to digitize the received paper copy of the document. For example, the document could be captured by photographing it using a camera.

Figure 2:
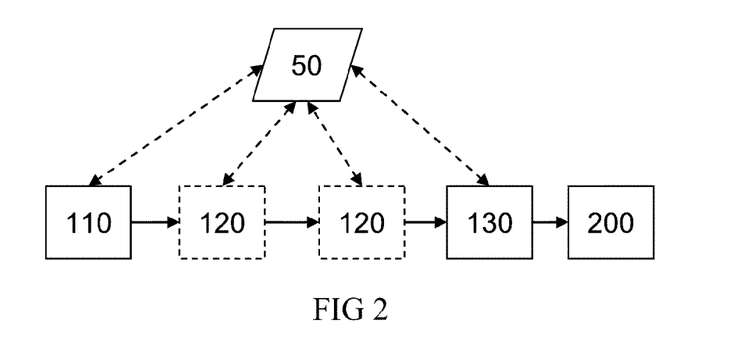
FIG. 2 is a flow diagram for secure print workflow control according to the embodiment of FIG. 1.

Secure Print Workflow Control will now be described in greater detail. A high-level flow diagram for Secure Print Workflow Control is shown in FIG. 2. The workflow is described as a sequence of entities, namely: SPW initiator 110, SPW Entity 120, and SPW Trusted Print Server 130. The communication patterns are depicted by arrows from left to right and patterns of data access to and from the SPW control information 50 are depicted by the diagonal arrows. The SPW Control Information channel 50 could be a lumped or distributed information system. If it is lumped, it can be stored electronically (for example, in a database or at a server) or it can be stored in machine-readable form on the printed paper copy of the document, using technologies such as a 2D barcode or using suitable information hiding techniques that can embed this information. If the SPW Control Information is provided on the printed paper document, the authenticity and integrity of the printed hardcopy will be verifiable using entirely off-line mechanisms—that is, without the need to connect to a central database or server.

Figure 3:
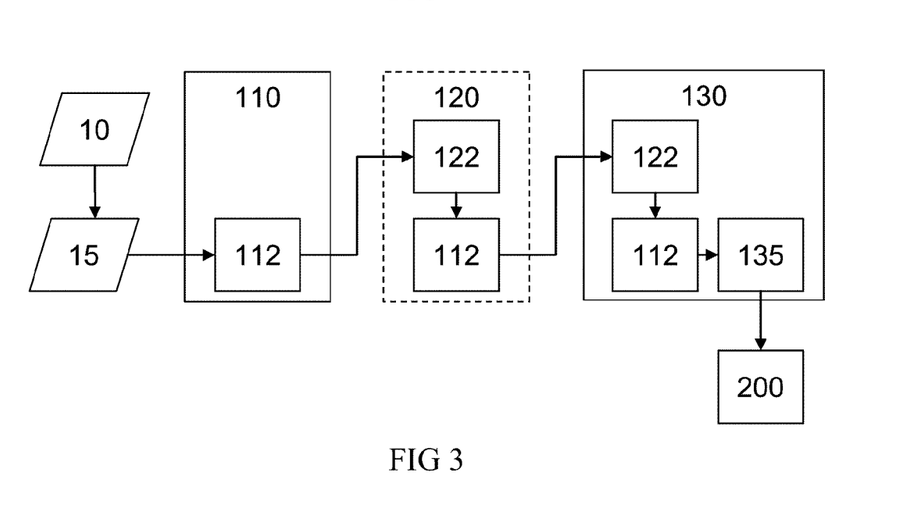
FIG. 3 shows the flow of data and control information for FIG. 1 in greater detail.

FIG. 3 shows a data and control flow diagram of the SPW control feature of FIG. 2, in greater detail. The SPW initiator 110 is the first entity in the workflow, corresponding to the person who creates the document. When the creator is ready to forward the document to the next user in the workflow, the SPW initiator software is used to generate and add workflow information. According to an embodiment, an image descriptor 15 is first extracted from the image. This descriptor is print-scan resilient—that is it describes characteristics of the document image which are substantially robust or invariant to the processed of printing on paper and re-scanning. Suitable print-scan resilient descriptors will be discussed later below.

The SPW initiator 110 digitally signs the image description using signature generator 112, along with other metadata such as date and time stamps and potentially also workflow specification data (which may be obtained from the workflow template 30). Collectively, all this information is referred to as "workflow information". The initiator 110 forwards the workflow information, which includes the initiator's digital signature and other metadata, to the next entity 120 in the workflow.

This SPW Entity 120 corresponds to a subsequent person in the document production workflow, as defined by the workflow template. For example, this person may be the superior of the person who created the document and the workflow may require that the superior approves this document before it can be printed and dispatched. The SPW entity 120 verifies the digital signature contained in the workflow information, in order to verify the authenticity of the workflow information as a whole. If the verification is successful (that is, the workflow information is authentic), the present user can then approve the document. In this way, the user authorizes next stage in the workflow. The SPW Entity 120 adds its own date and time stamps and optionally other metadata and then signs the workflow information. This workflow information still includes the digital signature previously inserted by the SPW initiator 110. The digital signature of the entity 120 is thus added to the verified signature of the initiator 110. The entity 120 then forwards the workflow information to the next entity in the workflow, which performs similar operations. The document may be forwarded together with, or separately from, the workflow information. There may be an arbitrary number of entities in the workflow. Each subsequent entity (after the SPW initiator 110), digitally signs the signature of the previous workflow participant or participants.

The SPW Trusted Print Server 130 also performs a similar operation. It then prints the Document Image Set 10 along with the signature trail generated by the workflow. The signature trail guarantees the sequence of operations, while the date/time stamp guarantees the date and time when each participant participated in the workflow.

Figure 4:
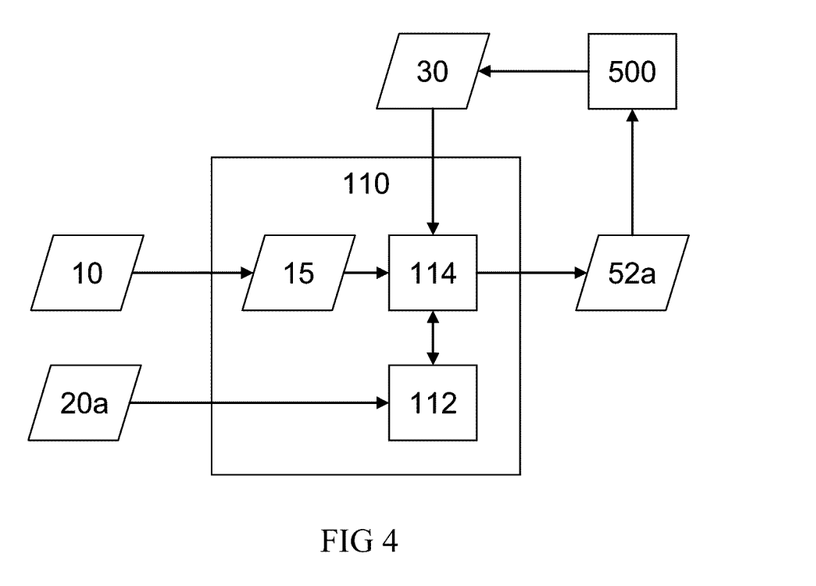
FIG. 4 illustrates the architecture of a secure print workflow initiator module according to the embodiment.

The SPW Control Initiator 110 will now be described in greater detail, with reference to FIG. 4. The SPW initiator 110 initiates a new secure print workflow instance by generating workflow information 52*a* using a set of document images 10 to be printed, the initiator's cryptographic private key 20*a*, and a workflow template 30 as the inputs.

Included in the workflow information 52*a* is a document image descriptor 15. This is extracted from the document image by the initiator and describes the appearance of the document image in such a way that substantive changes to the document will result in a different descriptor, but common distortions arising from printing and scanning will not result in a significantly changed descriptor. This can enable the document image descriptor to be used to later verify the authenticity of the document, because the descriptor can be compared (or combined) with the received version of the document image. If the document has changed significantly (for example, due to the intervention of a forger) then the descriptor allows this to be detected. The likelihood or missed forgeries (false negatives) should be low. The detection process can be either fully automatic, requiring no exercise of judgment on the part of the recipient; or semi-automatic, in the sense that the recipient retains final control over what types of changes are acceptable.

In any case, it is desirable that minor distortions and noise introduced by the processes of scanning and printing themselves, as well as manipulation of the paper copy (for example, creasing or folding), do not lead to false alarms (false positives). Various print-scan resilient image descriptors can be used in embodiments. One exemplary descriptor will be described later below. It is preferably, though not essential, that the descriptor should be more compact (in terms of information content or number of bits) than the document image itself. Typically, therefore, it will not be possible to uniquely reconstruct the document image from its descriptor alone. Reducing the size of the descriptor 15 reduces the size of the workflow information 52a that must be communicated to the recipient of the document.

The workflow data-structure generator 114 uses the image descriptor 15 along with other optional information, to generate workflow information 52a for a workflow instance. The other information can include meta-data such as the identity of the initiator and date and time that the instance was created, modified or signed by the initiator. The digital signature of the initiator is generated by the workflow digital signature generator 112. Algorithms for digitally signing data are well known. In the context of public key cryptography, a digital signature can be created by encrypting the data to be signed with the signer's private key 20a. Directly encrypting in this way would lead to very large signatures if the quantity the data to be signed is large. In this case, it is common to firstly use a secure hash algorithm, such as SHA-1, to generate a unique hash value (usually of fixed length) from the data and then encrypt this value in place of the data itself. In any case, the signature is generated based on the workflow information 52a, including the document image descriptor 15 using the initiator's cryptographic key 20a.

The workflow information 52a is sent by the SPW Initiator to the next participant in the Secure Print Workflow. The next participant can be either an SPW entity 120 or a trusted SPW print server 130 as depicted in FIGS. 2-3. The workflow information 52a may be transmitted along with the document image set 10, or it may be communicated separately. For example, the document image set may be sent by email or other conventional communication means, while the workflow information is passed via the workflow engine 500, as shown in FIG. 4.

The structure and operation of the SPW Entity 120 will now be described in greater detail, with reference to FIG. 5.

Figure 5:
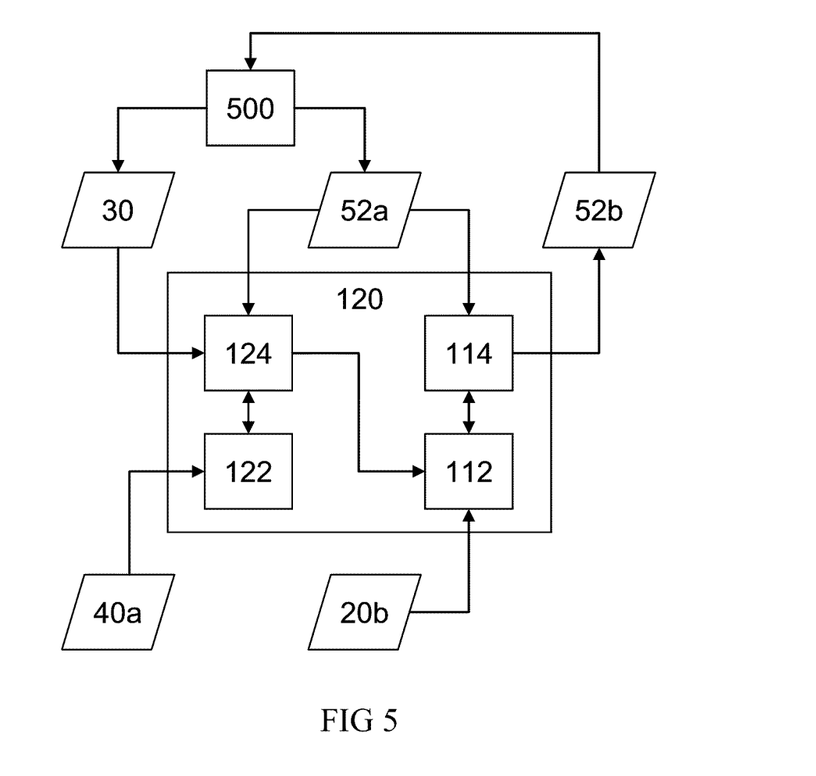
FIG. 5 illustrates the architecture of a secure print workflow entity according to the embodiment.

The SPW Entity is composed of verifier 122, 124 and updater 112, 114 components as show in FIG. 5. The verifier part 122, 124 uses workflow public key 40a and the workflow template 30 to validate the authenticity and correctness of the workflow information 52a using a signature verification algorithm. If the validation is successful (accepted), then the updater part 112, 114 updates and signs the workflow information to generate updated workflow information 52b, which is communicated to the next entity in the workflow by the Workflow Engine 500.

The verifier part comprises a workflow data-structure verifier component 124, which takes workflow information 52a (including the document image descriptor 15), workflow template 30, and provides a binary decision to accept or reject using the services of a digital signature verification algorithm 122. The digital signature verifier 122 corresponds to the digital signature generation algorithm 112 used by the preceding participant in the workflow. The digital signature verifier 122 takes the workflow public key 40a of the previous participant as input. The workflow template 30 can provide details of the requirements of the workflow. For example, it may specify the set of individuals who were properly authorized to initiate the workflow instance. It could also manage aspects such as timing: for example, it may specify that the data structure verifier 124 must reject the workflow information if the date and time stamps of the previous signature are too old (even if the signature itself is verified).

In the present example, the digital signature verification step 122 uses the public cryptographic key of the SPW initiator (the previous entity in the chain) to decrypt its signature. In accordance with known digital signature principles, the signature can be verified if the decoded signature matches the data 52a actually received. In the case that a hash function was used in the digital signature, the decoded signature should match the hash value extracted in the same way from the received data 52a. This verification of the digital signature verifies the integrity and authenticity of the received workflow information 52a.

The updater part comprises a workflow data-structure updater module 114, which is substantially similar to the workflow data-structure generator 114 of the SPW initiator 110. It also comprises a similar digital signature generator 112.

The data-structure updater module takes the previous workflow information 52a (including document image descriptor 15) as input in order to output updated workflow information 52b. The updated information 52b can be generated by adding the date and time when the update occurred (along with any other metadata) to the existing information 52a. The updated information 52b also includes a digital signature, based on this updated workflow information, using the private key 20b of the current entity. Once generated, the updated workflow information 52b and the document image set 10 are forwarded to the next entity in the chain. The communication channels may be the same as those used by the initiator 110 to transmit to the entity 120, described above.

Figure 6:
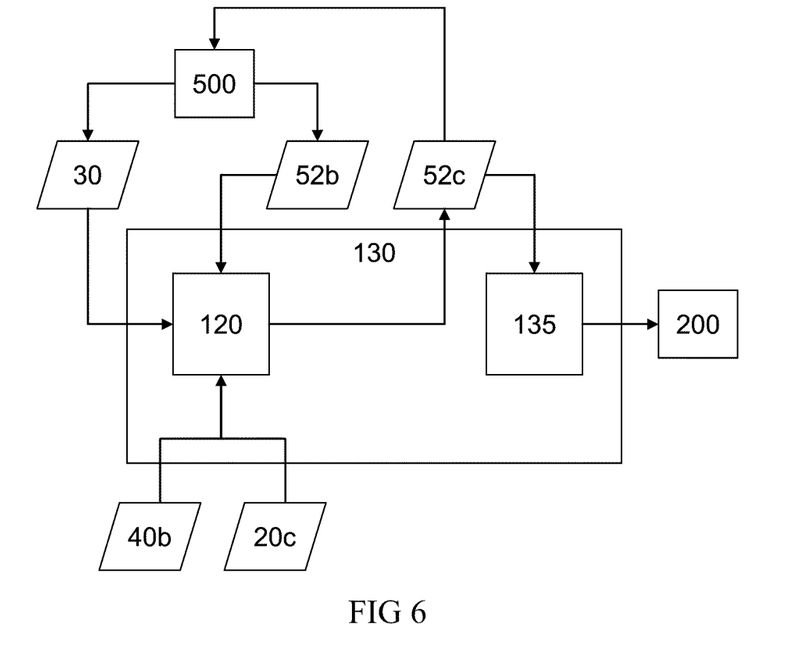
FIG. 6 illustrates the architecture of a trusted print server according to the embodiment.

The structure and operation of the SPW Trusted Print Server 130 will now be described, with reference to FIG. 6. The SPW Trusted Print Server comprises a SPW entity 120 and a Print Image Maker 135.

The SPW Trusted Print Server 130 performs all the operations of the SPW Entity 120, described above, and additionally makes the workflow information 52 printable by encoding it in a printable, machine-readable form and combining this with the document image set 10 for printing. Before making the document image set printable, the trusted print server 130 verifies and signs the workflow information just the same as every other entity 120. For the digital signature verification, the public key 40b of the previous participant in the workflow is used. For digital signing by the printer server 130, the server has its own private key 20c. The input workflow information 52*b* is updated with new metadata and the printer's signature, to generate updated workflow information 52*c*.

In some embodiments the Print Image Maker 135 can encode the entire updated workflow information 52*c* in printable machine-readable form. In the present embodiment, however, part of the workflow information 52*c* is printed 200 with the document image set and the remainder is communicated via the workflow engine 500. The choice of whether to include partial or complete workflow information 52 on the face of the printed document will depend on the application. For example, if some or all of the information is transmitted via the workflow engine 500, the consumer of the document will need access to this resource also, in order to fully verify the authenticity of the printed document when it arrives at its destination.

In general, it will be preferable for at least some of the information to be encoded on the printed copy, because the presence of this information can be used as a trigger to the verification system to retrieve the remainder of the information from the workflow engine 500. For example, the portion of the information on the printed copy could include at least an identifier identifying the document and the workflow engine 500 where the remainder of the workflow information 52*c* (and any template 30) is stored.

A 2D barcode is one machine-readable form suitable for printing workflow information on the printed copy. Other forms of printed digital communications, such as watermarking and spread-spectrum symbologies, could alternatively be used.

If the verification of authenticity of the workflow information (or integrity of the document image descriptor) fails at any stage, the system can take appropriate action. This may comprise stopping the workflow. For example, if the SPW entity fails to positively verify the workflow information, it may display a warning or error message to the present participant and prevent that user from digitally signing the document. Similarly, the trusted print server may print the document only if the authenticity of the image descriptor and the integrity of the received document are verified positively.

Alternatively, to avoid alerting a forger to the fact that the forgery has been detected, the workflow may appear to proceed as normal. At the same time, a supervisor or other authority could be alerted to the detection of a forged document. If authentication fails at the trusted print server, the printer might print the document with a visible (human readable) warning on its face, or may encode a machine-readable warning in the printed workflow information.

Figure 7:
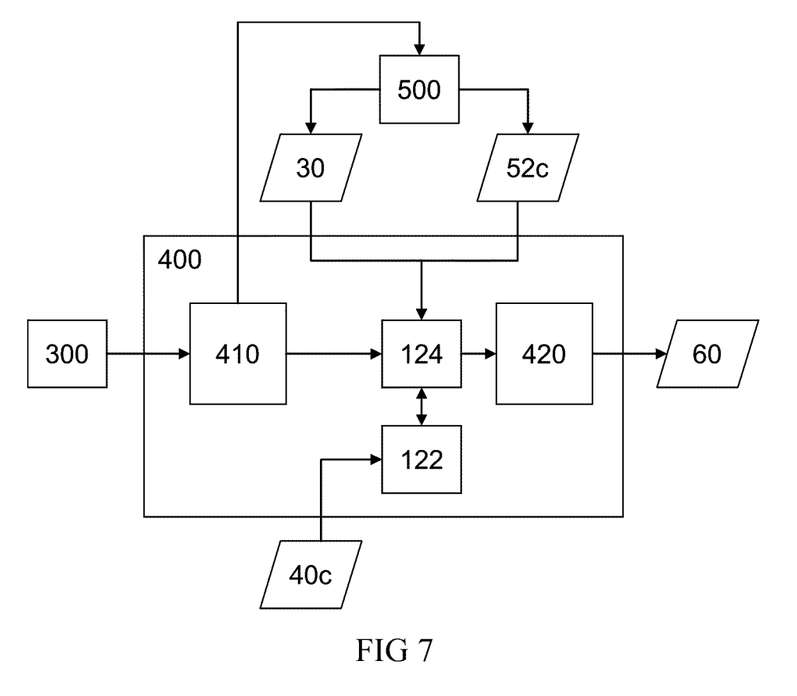
FIG. 7 illustrates the architecture of a secure print workflow verification module according to the embodiment.

The structure and operation of the Secure Print Workflow Verification module will now be described, with reference to FIG. 7.

The purpose of the verification is to identify and authenticate the workflow that generated the given SPW hardcopy, using the associated workflow information 52*c*. This workflow information may be available entirely from the paper-copy, for example as a barcode, or may be downloaded from an Enterprise database (such as workflow engine 500).

In the present embodiment, a portion of the workflow information 52*c* is available from the printed document. The printed copy is scanned 300 and the scanned document image is passed to a print image reader 410. The Print Image Reader 410 is the counterpart of the Print Image Maker 135 in the SPW Trusted Print Server module described previously. If the Print Image Maker 135 creates a 2D barcode, then the Print Image Reader 410 is a 2D-barcode reader and decoder. The Print Image Reader 410 identifies and decodes the machine-readable form to extract the first portion of the workflow information. The Print Image Reader 410 passes this partial information to the Workflow Engine 500 and retrieves the corresponding Workflow template 30 and the remainder of the workflow information 52*c*.

The complete, restored workflow information is then verified by the SPW verification module in the same way as an SPW entity. The data structure verifier 124 validates the data structure, including using the signature verifier 122 to verify the digital signature added by the trusted print server 130. The public key 40*c* of the trusted print server is used in this signature verification step.

Once the authenticity of the workflow information has been verified successfully, the integrity of the image descriptor is checked by an integrity verification algorithm 420. The details of this procedure will depend on the particular type of image descriptor used. However, the principle is that the workflow information (which has already been verified as authentic, using cryptographic techniques) contains the image descriptor 15. This verified image descriptor 15 can now be used as a gold standard against which to evaluate the received document image set 10. If the original document image set has been amended or replaced by a forger, then it will no longer match the original image descriptor 15. Any such discrepancy is noted in the report 60 of the integrity verification algorithm 420. The results of the authenticity and integrity verification tests are made available to the end-user in this report 60, using suitable user interfaces.

As discussed above, in some embodiments, the printed copy of the document includes all of the workflow information 52. If this is the case, then access to the Workflow Engine 500 is not required at the verification stage. However, the consumer should have access to at least the public key of the trusted print server 130, in order to enable the digital signature of the print server to be verified. As described above, each participant (including the print server 130) authenticates the signature of the previous participant before signing the workflow information themselves. In this way, the signatures are cumulative—each entity signs the signatures of all previous entities. This means that the consumer need only have access to the public key of the final entity in the production workflow—that is, the trusted print server 130.

The workflow information 52 is designed to accompany a document image during and after the printing process. In the present embodiment, it contains an identifier of the workflow template used in creating the information, the workflow instance description itself, and other information. The workflow template identifier is used to determine the organizational workflow template 30 used to create this workflow information.

The workflow instance description information is an aggregated information structure that contains information about workflow participants, timestamps, digital signatures, and other information. The participant digital signature is computed independently by each workflow participant based on the individual private keys. This means that the document image descriptor 15 is signed by all participants, since it is included in the workflow information from initiation.

The embodiment described above is focused on a process of printing; delivering to a recipient; and scanning. However, similar workflow-based cryptographic control can be enforced on other processes as well. For example, embodiments could be used in the context of document archiving.

Within the context of the printing process, the control could be used in various ways, including:

1. To authenticate printed content with respect to the organization's workflow and the users who participated in the workflow;

2. To provide a platform for integrating various printed-document integrity verification algorithms;

3. To provide a platform for integrating printed document track-and-trace systems. Track and trace systems can use Radio-Frequency Identification (RFID) or printed-image data hiding techniques.

The fine difference between document track-and-trace and document authentication is that an attacker's aim in the former settings is to evade authentication while the attacker's aim in the latter setting is to forge documents. To evade authentication means that the attacker makes it impossible for the true source of the document to be determined. This is relevant, for example, in the case of internal fraud within an organization, where the forger wishes to cover his or her tracks. So, if the workflow information is printed on the document as a barcode, for example, the attacker may try to evade authentication by interfering with this or removing it after printing. For this reason, data hiding techniques such as robust watermarking may be useful for printing the workflow information (or a portion of it) on the document. Such watermarks may be more difficult for the attacker to remove or corrupt without also compromising the plausibility or readability of the forgery.

Embodiments may be particularly useful in complex print workflows. For example, the human operator (or operators) and the printer may be geographically distributed and connected by a public network such as the Internet. This example encompasses the scenario of secure remote printing, where entities can send authorizations on paper—for example, to buy or sell stock market shares.

Various modifications can be made to the embodiment described above.

In the above embodiment, only the SPW integrity verification 400 actually verifies the integrity of the document image descriptor 15. The SPW entity 120 and the SPW trusted print server merely verify the authenticity of the workflow information (based on the digital signature verification). With this arrangement, if a forger modifies the document image set 10 (without attempting to alter the associated workflow information 52), the forgery will only be discovered upon receipt of the document by the consumer. It may therefore be desirable, in some applications, to verify the integrity of the image descriptor 15 at one or more intermediate stages. For example, the trusted print server could advantageously be modified to include the integrity verification algorithm 420, as well as the usual workflow information verification steps 122, 124.

All of the preceding embodiments assume that the document does not change after it has been entered into the workflow by the initiator 110. Of course, in practice, it may be desirable to allow editing of the document by subsequent participants. If an entity 120 wishes to modify the document image 10, image descriptor verification 420 should first be performed, to verify that the current document image is authentic. Then, when updating the workflow information 52, the entity would extract a fresh image descriptor 15 from the edited document image and add this to the workflow information 52, before digitally signing, as usual. The newly extracted descriptor 15 could replace the old descriptor. Optionally, however, the old descriptor could be retained together with the new descriptor. This may allow secure tracking of the changes made to the document, depending upon the capabilities of the image descriptor technology. For example, if the image descriptor 15 is able to identify specific regions of the document that have been changed, this could be used in conjunction with multiple versions of the image descriptor 15, to highlight changes (both genuine and forged, as required).

In general, intermediate verification of the integrity of the image descriptor 15 may help to identify the stage of the workflow at which an attack by a forger took place.

An exemplary image descriptor for the secure print workflow will now be described.

According to this example, markers are provided on the printed document. These are used so that when a received version of the document is scanned, the markers can be used to ensure that the scanned image is a high quality representation of the printed document, and/or to enable changes to the document to be easily identified. The markers can enable the complete process, from the digital domain to the paper domain and back to the digital domain, to be insensitive to the use of different printers and scanners, because the markers can be used for calibration purposes.

In more detail, a document processing method is provided in which document markers are added at predetermined locations of the electronically stored document before printing. The printed document is subsequently scanned to reconstruct a (new) digital image of the document. The document markers are used to provide threshold setting, and also determination of the individual pixel locations of the electronically stored document. This means that distortions can be corrected (for example physical damage of the paper document). Furthermore, changes to the document can be identified so that annotations can be identified or fraudulent changes can be spotted.

The document integrity is preserved and/or verified at the pixel level. In the detailed description which follows, a number of abbreviations will be used.

These are explained as follows:

ODI—Original document image 10. This is a digital representation of a document.

MDI—Marked document image. This is a version of the ODI to which markers have been added digitally to enable conservation of image quality and/or enable verification of document authenticity.

CPD—Candidate paper document. This is a paper document which may include manually made annotations, fraudulent modifications or any other changes.

SDI—Scanned document image. This is a scanned version of the CPD.

RDI—Reconstructed document image 10a. This is a processed version of the SDI, which aims to restore the image to the same state as the ODI.

The technique treats the electronic original document image (ODI) as an array of pixels, for example a bitmap representation. A property set is computed on the image pixels. This property set is a collection of any suitable functions of the pixels/group of pixels which constitute the image. The property set in one example provides a compressed representation of the pixel properties of the ODI.

The reconstructed document image (RDI) is also an array of pixels.

A pixel representation (of the MDI) is the last step before printing the paper document, and also the first step while crossing back into the digital world. This means that the compressed representation of the pixel properties can most effectively be used as a mechanism for ensuring document integrity. In the description below, it is assumed that the ODI and RDI have a binary pixel level (either black (0) or white (1)). The approach can of course be extended to include multiple pixel levels.

The digital-to-paper stage will first be described. This stage processes a digital image representation before the paper version is printed. The ODI can be assumed to an N×M array of pixels. If required, suitable cropping, smoothing, removal of unwanted data, and other "clean up" operations can be performed.

A suitable property set of pixels of the ODI is then generated. This property set forms the document image descriptor 15 in the secure print workflow. In examples, this property set provides a compressed representation of the image, which takes account of individual pixel values. This compressed representation can be combined with the document image at a later stage to ensure that the properties have not been altered by modifications performed on the document. This is a subsequent "combine" step, described further below. In an extreme example, the property set may include the full ODI itself, in which case there is no such compression.

In this example, error correcting code (ECC) parities over the ODI pixels are computed and stored. These can then be retrieved in the paper-to-digital stage, for rectifying pixel errors in the RDI.

One way of computing the property set (document image descriptor 15) is as follows. The property set PS is a collection of 'n' properties P1, P2, . . . Pn:

$$PS = \{P1, P2, \ldots, Pn\},$$

where a property Pi is computed as follows.

The array of pixels in the ODI is divided into 't' blocks, denoted as ODI1, ODI2, . . . , ODIt. Then the property Pi is computed as the following array $$Pi = [Pi\_1 Pi\_2 \ldots Pi\_t] = [fi(ODI1)fi(ODI2) \ldots fi(ODIt)]$$

where fi is a suitable operation chosen according to the application and processing requirements. In the extreme case, the property set could be the entire ODI itself. Thus the present concept of 'property set' includes as a special case the use of the entire ODI for processing.

The ODI is then divided into cells. Each cell is a square T×T array of pixels. The cells may be different from the 'blocks' used for defining the property set.

If N and M (the dimensions of the ODI) are not integer multiples of T (the cell dimension), then the ODI can be padded with blank (white) pixels up to the required dimensions.

Figure 8:
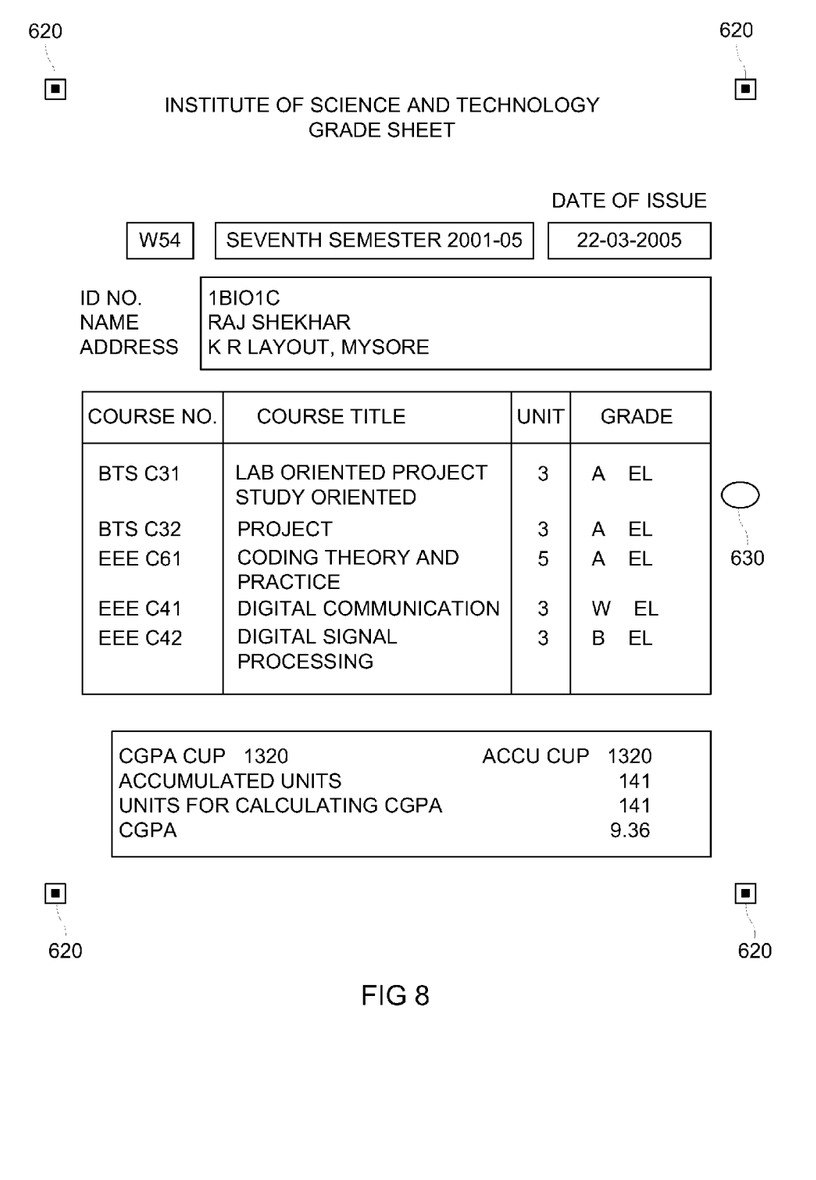
FIG. 8 shows an example document image to which markers have been added.
Figure 9:
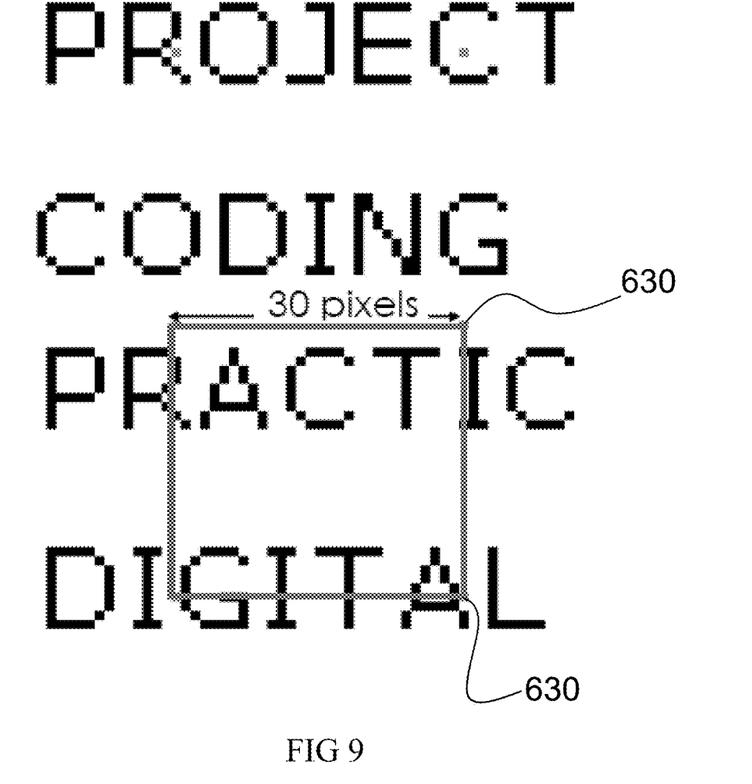
FIG. 9 shows an enlarged portion of the image of FIG. 8.

FIGS. 8 and 9 show an example with N=M=501 pixels and T=30 pixels. FIG. 8 shows the complete MDI as a typical document. FIG. 9 shows an enlarged portion of the MDI to show the pixel resolution. It is noted that the textual content of the document is irrelevant and is shown only by way of demonstration.

In this example, dot markers are added in the digital domain to the cell corners. These are shown as 630 in FIG. 9 and they have a size of 1 pixel. Any suitable scheme can be used for the dot markers. In the example of FIG. 9, the ODI is scaled to an 8-bit representation (black=0 and white=255), and the dot markers are single pixels of grey-value 150. Alternatives for dot markers include using other suitable pixel levels, shapes or any other markers that are visually unobtrusive but easily detected upon scanning.

Corner markers are also added of size C×C pixels on the four corners of the dot-marked ODI. These corner markers are shown as 620 in FIG. 8. In this example, the corner markers have a dimension of 15 pixels square and there is a horizontal and vertical blank space of 5 pixels separating the corner markers 620 from the nearest dot marker 630. The corner markers are specifically designed for auto-calibrating the black, white and dot-marker grey levels. This helps to make the solution printer and scanner independent. Furthermore, two different markers can be chosen for the left and right corners to help identify any 90, 180 or 270 degree orientation offsets.

Figure 10:
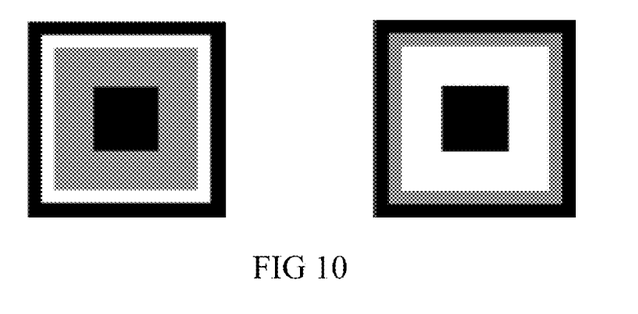
FIG. 10 shows in more detail examples of one of the types of markers of FIG. 8.

An enlarged view of the left and right corner markers is shown in FIG. 10.

The left corner marker has a black centre, a grey first surround, a white second surround and a black outer surround. The right corner marker has a black centre, a white first surround, a grey second surround and a black outer surround.

The document image at the end of the digital-to-paper stage is the marked document image (MDI). The MDI is then printed (using a suitable resolution printer), and makes its way through the paper world with possible additions, manual edits, modifications, deletions, annotations, wear and tear associated with paper handling and storage such as photocopying, folds, stains, marks, staples, bruises etc.

When the paper document is ready to cross back into the digital world, it is referred to as the candidate paper document (CPD).

The return-leg of the digital-to-paper-to-digital cycle will now be described.

The CPD is scanned using sufficient resolution to distinguish the individual pixels, and thereby identify the corner marker and dot marker levels. For example, 8-bit grey-scale scanning at 300 ppi can be used. The scanned CPD is referred to as the scanned document image (SDI).

Figure 11:
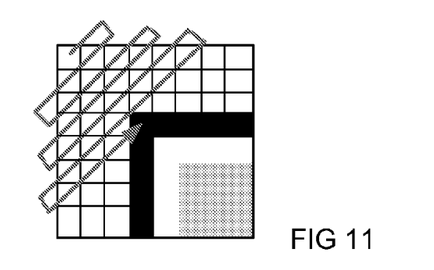
FIG. 11 illustrates one possible method of finding a marker location.

The positions of the corner markers in the SDI are identified. For example, the top left corner marker is detected by starting at the top left corner of the SDI and making a diagonal zigzag search for the first black pixel. This search process is shown in FIG. 11. This corresponds to the corner black pixel in the corner marker of FIG. 10. Then, additional row, column and other consistency checks are performed to avoid spurious matches. Finally the entire marker pattern from the SDI is matched to the actual marker pattern to confirm the detection of the corner marker. This process is repeated for all four corner markers.

At this stage, any 90, 180, 270 degree orientation mismatches can be caught by virtue of the different left and right markers, and this offset can be rectified.

The three grey levels are calibrated using the corner markers. The corner markers in this example are especially designed to enable calibration of the white, black and dot-marker levels. Since the actual marker pattern is known, statistical data for the SDI corner markers such as histogram, mean, variance and other moments can be collected, which provides a basis for calibration. In one example, suitable detection thresholds can be computed using statistical data. This helps in making the solution printer and scanner independent. The dot markers can also be used for grey level calibration, instead or as well as the corner markers.

The positions of the dot markers in the SDI are also located. There are several possible ways of doing this. One approach is described below.

Figure 12:
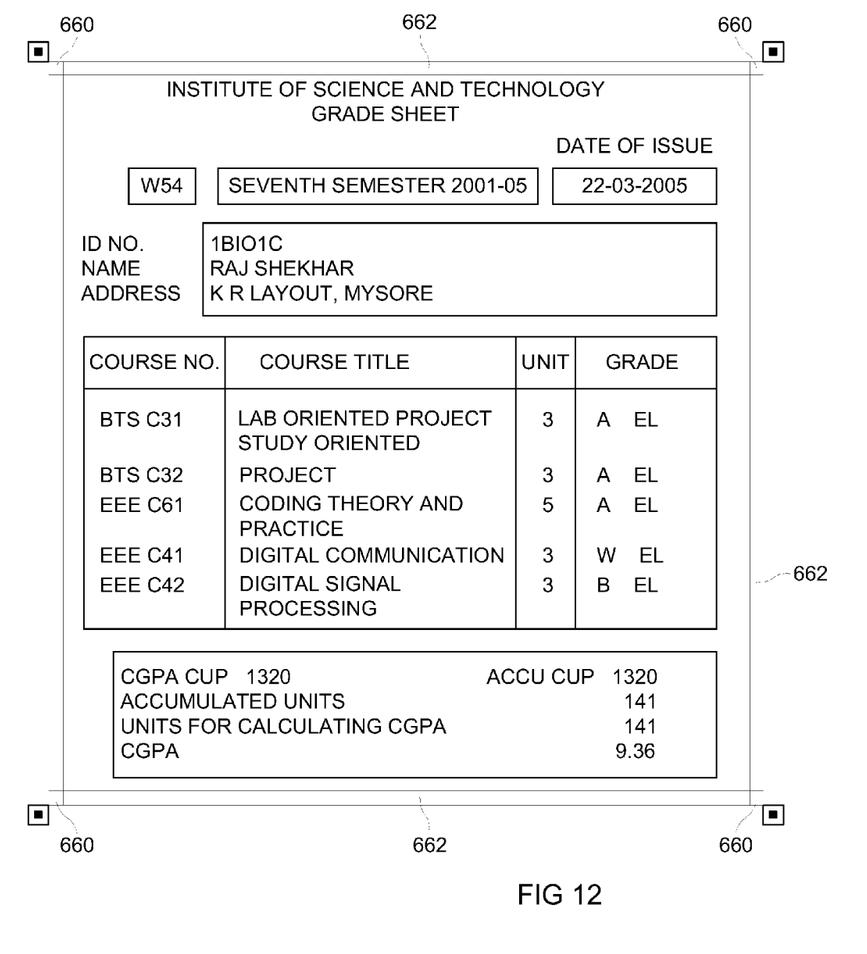
FIG. 12 shows the document of FIG. 8 and illustrates how all the markers are found.

(i) The four dot markers nearest to the four corner markers are first located. These are shown as 660 in FIG. 12. This is done by first computing a coarse location from the previously identified corner marker positions, and then searching a small neighborhood around the coarse location. The searching step fine-tunes the coarse location and helps achieve high precision.

(ii) The other boundary dot markers are then located using the four detected dot markers. These other boundary dot markers are in the regions 662 shown in FIG. 12. Once again, a coarse location for each dot marker is computed first, and then fine-tuned by searching its neighborhood. The coarse location is computed using a bilinear transform.

(iii) Finally, the remaining dot markers are located using the boundary dot markers previously identified. A similar two step procedure is adopted.

At the end of these three steps all the dot marker positions are known.

The document image can then be reconstructed by detecting the pixels within each cell using the corresponding dot marker positions. This consists of two steps:

Pixel location synchronization: The corner positions of each T×T cell are known by virtue of the dot marker detection. The individual location of each of the $T^2$ pixels within a cell is then found using a bilinear transform. This process essentially forms a grid based on the dot marker positions. This means that even if the dot markers no longer define a square, the individual pixels can still be identified so that the original shape of the document can be reconstructed. Thus, the dot markers enable local distortions in the paper document to be corrected. Thus, the dot markers are used to determine the locations of the scanned document which are to be processed to derive the pixels of a digital image of the document. This means that the pixel positions are not necessary assigned to the scanned document as a regular grid of positions.

Each of the T×T pixels is then classified into one of the pixel levels—white or black for this example. Of course, for a grey scale or color application, grey scales or colors would be allocated to the pixels.

For the simpler binary application, a hard-decision detection using bilinear interpolation can be carried out, and the threshold determined in the auto-calibration can be used.

The pixel values for the dot marker locations are estimated using a simple prediction algorithm that uses the contextual neighborhood. This means the dot markers are removed from the image, so that the reconstructed image (RDI) has had the dot markers removed.

Thus, all the pixels are detected and the reconstructed document image (RDI) is obtained.

Although the process has provided reshaping of the image, as well as calibration of the black, white and grey levels, the RDI may still contain pixel errors.

In order to correct these errors, the property set can be used, in examples which use a property set.

The stored property set is retrieved, and the paper document is processed by suitably 'combining' the property set with the RDI. The method of combining the property set with the RDI is chosen suitably according to the application and processing requirements.

In this example, where ECC parities were used as a property in the digital-to-paper stage, the corresponding ECC decoding can be performed to rectify some/all of the remaining pixel errors.

The combine step will now be described, by way of example, in the context of the secure print workflow described above The property set for this example is computed as follows:

PS={P1,P2} where P1 and P2 are the two properties.

For computing P1, the ODI is divided into square blocks of 3×3 pixels. Since each pixel is binary (either white (1) or black (0)), each block can be viewed as a symbol over Galois Field GF(512). The blocks are then spatially interleaved and fed into a systematic (511,411) Reed-Solomon (RS) encoder. Thus, the RS encoder outputs 100 parities for each set of 411 input blocks. The entire array of parities forms the property P1.

For computing P2, the ODI is divided into square blocks of 30×30 pixels. Each block can now be viewed as 100 GF(512) symbols. Once again the blocks are suitably interleaved and now fed in to a systematic (420,400) RS encoder. In this case, the RS encoder outputs 20 parities for each set of 4 input blocks. As before, the entire array of parities forms P2.

With the above-described P1 and P2, the total size of PS is around 30% of the ODI size.

Figure 13:
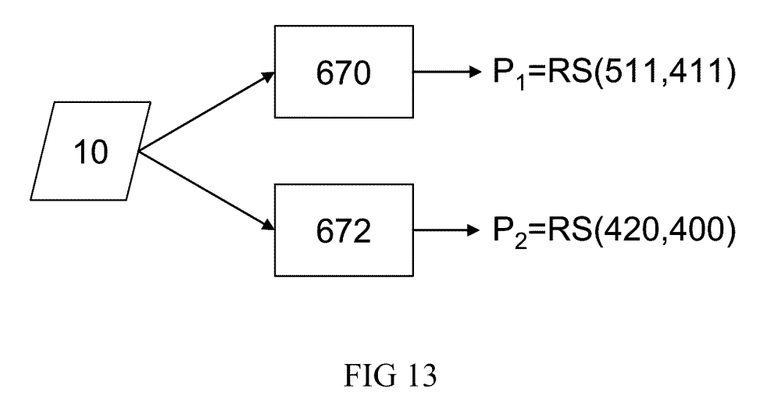
FIG. 13 is an example of processing applied to an original image to derive a property set used in an image descriptor according to an embodiment.

P1 and P2 are computed from the ODI 10 in a parallel fashion as shown in FIG. 13. Interleaver 670 is used in the computation of P1, and interleaver 672 is used in the computation of P2.

These properties P1 and P2 are chosen in this example to identify modifications or tampers made to the document—especially the paper record. The interleavers are used to combat spatially contiguous modifications by effectively dispersing them for the decoding in the combine step.

At the SPW verification module 400, the candidate paper document (CPD) is scanned, and the reconstruction proceeds as described for the paper-to-digital stage, to derive the reconstructed document image (RDI).

Figure 14:
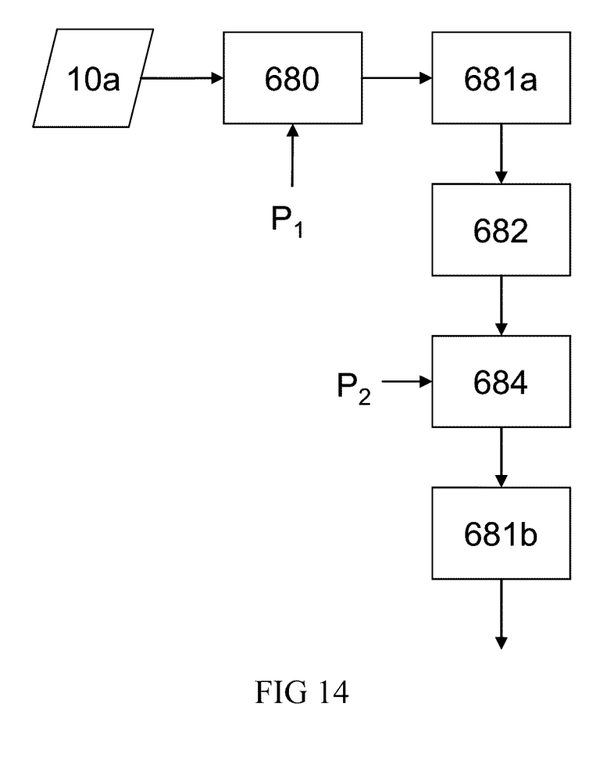
FIG. 14 illustrates how the property set is subsequently used.

In the combine step, the property set is retrieved and combined with the RDI using a concatenated decoding procedure shown in FIG. 14.

The RDI 10$a$ is first decoded using a standard RS decoding procedure with property P1 as the parities. The decoder 680 corresponds to the (511,411) systematic RS code. The output of the first RS decoder is then fed into the (420,400) RS decoder 684 with P2 as the parities. Appropriate de-interleaving (681$a$, 681$b$) and interleaving 682 is carried out at each stage.

The output of the concatenated decoding stage is the verified document image (VDI). The difference between the verified document image (VDI) and RDI indicates the alterations which the paper record has undergone.

For the current application, where the verifier is interested in tracking the modifications, a color coding scheme can be used to display the output. An image incorporating the color coding scheme provides a Color Coded Output (CCO). A human verifier then looks at the CCO and judges whether the indicated modifications are malicious or benign, and accordingly decides on the veracity of the paper record.

One example illustrative of many possible color coding schemes is as follows:

A pixel in the color coded output image is marked:
Yellow—if the pixel value is the same in the verified document image (VDI) as well as the RDI.
Blue—if the pixel value was white in the VDI and black in the RDI (indicating addition of content).
Red—if the pixel value was black in the VDI and white in the RDI (indicating deletion of content).

This approach can detect even if only a few pixels are added, for example changing a "3" to an "8". A very small fraction of random pixel errors could remain in the CCO image. In such a case, the human verifier can use discretion to easily distinguish between the random errors and malicious modifications.

In this way, semi-automatic verification of the integrity of the document image descriptor 15 is provided. The descriptor 15 is first electronically combined with the received document image 10 to identify differences at the pixel level. Then the differences are presented to a human user, for visual inspection of their significance. Note that the example described above uses markers on the printed document to achieve proper registration of the original and scanned document images. As will be apparent to the skilled person, however, when the image descriptor 15 is to be verified at an intermediate stage in the workflow, it is not necessary to use the markers for registration, because the document is still in electronic form. The markers only become relevant when the document is printed, delivered to the consumer and scanned.

In the above description, the use of an error correcting code can allow the integrity verification algorithm 420 to report to the user exactly what pixel-level changes were made to the document. However, it may be sufficient in some applications to provide error detection—wherein the presence and general location of a change is identified, but the nature of the change itself is not.

Naturally, other forms of image descriptor 15 may be suitable for use with embodiments. As outlined above, the requirement is that the descriptor is suitable for later verifying the authenticity of a version of the document image that has been printed and scanned—in short, that it is print-scan resilient. For example, image fingerprinting or visual signature algorithms that can robustly extract features of the document image may be used. In this case, the verification algorithm 420 operates by extracting a fingerprint or signature using the same algorithm used by the SPW initiator 110. The two descriptors are compared electronically by the verifier 420. If the significant differences exceed a threshold, then the integrity verification fails. This may allow fully automatic integrity verification. However, in some applications it may be less precise than a human judgment in a semi-automatic method.

Note that conventional, general data hashing algorithms such as SHA-1 will not be suitable as the image descriptor, because these are not print-scan resilient. Such hash algorithms would treat a document image as a generic bitstream, taking no account of the visual significance of the bits. Thus, if even a single bit were to change (for example, due to noise introduced by the printing and scanning processes), the hash value would change and the integrity check would fail.

As will be apparent to those skilled in the art, the various elements of the embodiments described can be implemented in software. For example, the SPW initiator 110, SPW entities 120, SPW trusted print server 130 and SPW verification 400 can be implemented as software modules. The components of each of these modules, described in detail above, may be implemented as software sub-routines or sub-modules. As will also be apparent, the different software modules will typically run on different computers, since the different participants in the workflow will typically each have their own. For example, the SPW initiator 110 software module may run on a first personal computer (PC); an SPW entity 120 module on a second PC; the SPW trusted print server 130 on a printer server; and the SPW verification module 400 on a PC of the consumer. The workflow engine 500, if provided, may comprise a software program running on a centralized server. In this case, client software would be provided on the PCs of the individual participants, to electronically communicate with the server. As the skilled person will understand, these examples are not limiting on the manner in which embodiments are implemented.

Embedded implementations are also possible. Indeed, it may be advantageous to provide an embedded implementation of the SPW trusted print server in the hardware or firmware of a printer and the SPW verification module in the hardware of firmware of a scanner.

Such a printer would thus be adapted to print secure paper documents for a secure print workflow. It would comprise one or more inputs for receiving the document image and workflow information associated with the document. These may be of conventional printer-interface types, such as a network connection, Universal Serial Bus (USB) or parallel printer connections. The printer would also comprise a processor adapted to perform verification of the workflow information and optionally the integrity of the content of the document image. This might be a general purpose microprocessor, suitably programmed; or it might comprise bespoke hardware, such as a cryptographic co-processor or application specific integrated circuit (ASIC).

A scanner with embedded SPW functions would have the features of a conventional scanner, but with additional processing capabilities. In particular, it would include a processor adapted to receive the workflow information by decoding a portion of the workflow information printed in a machine-readable form on the printed copy, after the printed copy has been scanned. The scanner may then output the scanned document image and the decoded portion of the workflow information via a communications interface.

Alternatively, the scanner could implement all the functions of the SPW verification module 400. In this case, the scanner could use the decoded portion of the workflow information to contact the workflow engine (for example, via a network connection) to retrieve the additional data needed to authenticate the scanned document image. This may include the remainder of the workflow information (in the event that not all of this information was present in machine-readable form on the print-copy) and the workflow template. The scanner would also need to obtain the public key of the trusted print server. The processor in the scanner would then verify the digital signature and verify the integrity of the content of the document image, using the integrity verification algorithm on the image descriptor. The scanner would then output a report and the scanned document image to the user.

In one embodiment, a multi-function printer (MFP) may be provided, which implements the functions of the trusted print server 130 and the SPW verification module 400 in the same device.

Data and instructions of the various software modules mentioned above and any other software components of the system are stored in respective storage devices, which are implemented as one or more computer-readable or computer usable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

While specific embodiments have been described herein for purposes of illustration, various other modifications will be apparent to a person skilled in the art and may be made without departing from the scope of the invention.

The invention claimed is:

1. A method, for a first participant in a secure document workflow, of generating workflow information for authenticating a document, the method comprising:
   receiving an image of the document;
   generating workflow information for the document image, including a document image descriptor dependent upon the appearance of the document image for later verifying the integrity of a version of the document image that has been printed and scanned, the verification comprising electronically combining or comparing the document image descriptor with said version of the document image;

generating a digital signature for later verifying the authenticity of the workflow information, the digital signature being derived from the workflow information using a cryptographic key associated with the first participant;

adding the digital signature to the workflow information; and communicating the document image and the workflow information to another workflow participant.

2. A method, for a second participant in a secure document workflow, of authenticating a document image, the method comprising:

receiving the document image from a first workflow participant;

receiving workflow information relating to the document image, including:

a document image descriptor, dependent upon the appearance of the document image for verifying the authenticity of a version of the document image that has been printed and scanned, and a first digital signature generated by the first participant, derived from at least the document image descriptor;

verifying the authenticity of the image descriptor, wherein the verification comprises verifying the digital signature; and verifying the integrity of the received document image, wherein the verification comprises electronically comparing or combining the received document image with the verified image descriptor.

3. The method of claim 2, further comprising:

generating a second digital signature for later verifying the authenticity of the workflow information, the digital signature being derived from the workflow information using a cryptographic key associated with the second participant;

adding the digital signature to the workflow information; and communicating the document image and the workflow information to another workflow participant.

4. The method of claim 1, wherein the step of communicating the document to another workflow participant comprises:

printing a copy of the document; and printing a portion of the workflow information in a machine-readable form on the printed copy.

5. The method of claim 4, wherein the step of communicating the workflow information to another workflow participant comprises electronically communicating a portion of the workflow information.

6. The method of claim 4, wherein the step of communicating the workflow information to another workflow participant comprises printing the entire workflow information in a machine-readable form on the printed copy.

7. The method of claim 2, wherein:

the step of receiving the document image from the first workflow participant comprises scanning a printed copy of the document; and the step of receiving the workflow information comprises decoding a portion of the workflow information printed in a machine-readable form on the printed copy.

8. The method of claim 1, wherein the document image descriptor comprises an error detecting code or an error correcting code, preferably a Reed-Solomon code.

9. The method of claim 1, wherein, if a region of the document is modified, the image descriptor enables the location of that region to be identified.

10. The method of claim 1, wherein the workflow information further comprises metadata including at least one of:

the identity of one or more participants in the workflow; and the date and/or time of participation of said one or more participants.

11. A computer program product for a first participant in a secure document workflow to generate workflow information for authenticating a document, the computer program product comprising:

a non-transitory computer readable storage medium comprising computer usable program code embodied therewith, the computer usable program code comprising:

computer usable program code to, when executed by a processor, receive an image of the document;

computer usable program code to, when executed by a processor, generate workflow information for the document image, including a document image descriptor dependent upon the appearance of the document image for later verifying the integrity of a version of the document image that has been printed and scanned, the verification comprising electronically combining or comparing the document image descriptor with said version of the document image;

computer usable program code to, when executed by a processor, generate a digital signature for later verifying the authenticity of the workflow information, the digital signature being derived from the workflow information using a cryptographic key associated with the first participant;

computer usable program code to, when executed by a processor, add the digital signature to the workflow information; and computer usable program code to, when executed by a processor, communicate the document image and the workflow information to another workflow participant.

12. A computer program product for a first participant in a secure document workflow to generate workflow information for authenticating a document, the computer program product comprising:

a non-transitory computer readable storage medium comprising computer usable program code embodied therewith, the computer usable program code comprising:

computer usable program code to, when executed by a processor, receive an image of the document;

computer usable program code to, when executed by a processor, generate workflow information for the document image, including a document image descriptor dependent upon the appearance of the document image for later verifying the integrity of a version of the document image that has been printed and scanned, the verification comprising electronically combining or comparing the document image descriptor with said version of the document image;

computer usable program code to, when executed by a processor, generate a digital signature for later verifying the authenticity of the workflow information, the digital signature being derived from the workflow information using a cryptographic key associated with the first participant;

computer usable program code to, when executed by a processor, add the digital signature to the workflow information;

computer usable program code to, when executed by a processor, communicate the document image and the workflow information to another workflow participant;

computer usable program code to, when executed by a processor, control a printer to print a copy of the document; and computer usable program code to, when executed by a processor, print a portion of the workflow information in a machine-readable form on the printed copy.

13. A printer adapted to print documents for a secure document workflow, the printer comprising:

an input, for receiving the document from a workflow participant;

an input, for receiving workflow information associated with the document, including:

an image descriptor, dependent upon the appearance of the document for verifying the integrity of a version of the document that has been printed and scanned, and a first digital signature generated by the participant, derived from at least the image descriptor;

a processor, adapted to verify the authenticity of the image descriptor, comprising verifying the first digital signature;

verify the integrity of the received document, wherein the verification comprises electronically comparing or combining the received document with the verified image descriptor;

generate a second digital signature for later verifying the authenticity of the workflow information, the digital signature being derived from the workflow information using a cryptographic key associated with the printer; and to add the digital signature to the workflow information, and printing apparatus, controllable by the processor to print a copy of the document; and print at least a portion of the workflow information in a machine-readable form on the printed copy.

14. The printer of claim 13, adapted to print the copy of the document only if the authenticity of the image descriptor and the integrity of the received document are verified positively.

* * * * *

UNITED STATES PATENT AND TRADEMARK OFFICE
CERTIFICATE OF CORRECTION

PATENT NO.       : 8,477,379 B2  
APPLICATION NO.  : 12/629070  
DATED            : July 2, 2013  
INVENTOR(S)      : Kapaleeswaran Viswanathan et al.

Page 1 of 1

It is certified that error appears in the above-identified patent and that said Letters Patent is hereby corrected as shown below:

On the Title page, in item (75), Inventors, in column 1, line 4, delete "Ayyanahal" and insert -- Ayyanahalli --, therefor.

Signed and Sealed this
Twenty-sixth Day of November, 2013

Margaret A. Focarino
*Commissioner for Patents of the United States Patent and Trademark Office*